United States Patent
Oishi et al.

(10) Patent No.: US 11,431,159 B2
(45) Date of Patent: Aug. 30, 2022

(54) ELECTRICAL CONNECTION BOX AND COVER STRUCTURE FOR ELECTRICAL CONNECTION PART

(71) Applicant: Yazaki Corporation, Tokyo (JP)

(72) Inventors: Shinya Oishi, Shizuoka (JP); Kazuki Kobayashi, Shizuoka (JP); Chihiro Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 122 days.

(21) Appl. No.: 17/146,451

(22) Filed: Jan. 11, 2021

(65) Prior Publication Data

US 2021/0226431 A1    Jul. 22, 2021

(30) Foreign Application Priority Data

Jan. 16, 2020 (JP) .............................. JP2020-005018

(51) Int. Cl.
*H02G 3/14* (2006.01)
*H02G 3/08* (2006.01)

(52) U.S. Cl.
CPC .............. *H02G 3/14* (2013.01); *H02G 3/081* (2013.01)

(58) Field of Classification Search
CPC H02G 3/08; H02G 3/081; H02G 3/14; H02G 3/16; H02G 3/088; H02G 3/185; H05K 5/00; H05K 5/02; H05K 5/0217; H05K 5/03; H01R 13/46; H01R 13/52; H01R 13/5213; H01R 13/53; B60R 16/02; F16C 11/04; F16C 11/00

USPC .. 174/480, 481, 50, 53, 57, 58, 66, 67, 559, 174/560, 542; 220/3.2–3.9, 4.02, 241, 220/242; 439/536, 535
See application file for complete search history.

(56) References Cited

U.S. PATENT DOCUMENTS

| 5,076,455 A | * | 12/1991 | Begley | H02G 3/14 |
| | | | | 220/812 |
| 5,146,650 A | * | 9/1992 | Robertson | H05K 5/0226 |
| | | | | 16/259 |
| 5,317,108 A | * | 5/1994 | Prairie, Jr. | H02G 3/14 |
| | | | | 174/67 |
| 6,133,531 A | * | 10/2000 | Hayduke | H02G 3/081 |
| | | | | 174/67 |
| 7,626,121 B1 | | 12/2009 | Cleghorn | |

(Continued)

FOREIGN PATENT DOCUMENTS

JP    2008-113534 A    5/2008

*Primary Examiner* — Angel R Estrada
(74) *Attorney, Agent, or Firm* — Kenealy Vaidya LLP

(57) ABSTRACT

An electrical connection box includes a housing member, a first cover member, a second cover member, a hinge structure between the first and the second cover members, and a detachment prevention structure that disables detachment of the second cover member from the first cover member. The hinge structure includes a rotation shaft of the first cover member, a bearing of the second cover member, and a through hole in the first cover member. The through hole allows the bearing to be inserted from a free end and move in a direction that intersects an insertion direction of the bearing and is perpendicular to the axial direction of the rotation shaft to be fitted to the rotation shaft. The detachment prevention structure includes a rotational retaining section of the bearing and a retainer of the housing member.

5 Claims, 11 Drawing Sheets

(56) References Cited

U.S. PATENT DOCUMENTS

| | | | | |
|---|---|---|---|---|
| 8,633,385 B2* | 1/2014 | Korcz | ............... | H02G 3/088 174/67 |
| 8,944,266 B2* | 2/2015 | Roemer | ............... | H02G 3/185 174/76 |
| 9,035,182 B2* | 5/2015 | Scanzillo | ............... | H02G 3/088 174/67 |
| 9,203,222 B2* | 12/2015 | Korcz | ............... | H02G 3/088 |
| 10,931,053 B2* | 2/2021 | Thomas | ............... | H01R 13/5213 |

* cited by examiner

ELECTRICAL CONNECTION BOX AND COVER STRUCTURE FOR ELECTRICAL CONNECTION PART

CROSS-REFERENCE TO RELATED APPLICATION(S)

The present application claims priority to and incorporates by reference the entire contents of Japanese Patent Application No. 2020-005018 filed in Japan on Jan. 16, 2020.

BACKGROUND OF THE INVENTION

1. Field of the Invention

The present invention relates to an electrical connection box and a cover structure for an electrical connection part.

2. Description of the Related Art

Vehicles such as automobiles are conventionally equipped with various electric connection objects and have housings enclosing electrical connection parts relating to these electric connection objects. Such a housing has a work opening that enables work relating to the electrical connection parts (e.g., attachment and detachment of the electric connection object) when required. The housing thus has a cover for closing the work opening. For example, Japanese Patent Application Laid-open No. 2008-113534 discloses this type of housing.

The cover may be molded integrally with the housing and other parts such as a living hinge. Alternatively, the cover may be molded as a part separate from the housing (a cover member) and then coupled to the housing by a hinge structure. In the latter case, the hinge structure is configured to allow the cover member to rotate between an open position and a closed position relative to the work opening. It is desirable that the hinge structure be configured so that the cover member is not detached from the housing in any position between the open position and the closed position.

SUMMARY OF THE INVENTION

It is an objective of the present invention to provide an electrical connection box and a cover structure for an electrical connection part that are capable of limiting detachment of a cover member regardless of a rotational position of the cover member.

In order to achieve the above mentioned object, an electrical connection box and a cover structure for an electrical connection part according to one aspect of the present invention includes a housing member having an opening and an interior space connecting to the opening, the interior space accommodating an electrical connection part; a first cover member including a closure section that closes the opening and has a work opening enabling work relating to the electrical connection part; a second cover member configured to close the work opening; a hinge structure configured to allow the second cover member to rotate within a rotational range between an open position and a closed position relative to the work opening; and a detachment prevention structure configured to disable detachment of the second cover member from the first cover member in an assembled state in which the first cover member to which the second cover member is coupled is coupled to the housing member, wherein the hinge structure includes a rotation shaft provided on the closure section, an arc-shaped cantilever bearing provided on the second cover member, the bearing having an inner circumference surface supporting the rotation shaft, and a through hole formed in the closure section, the through hole accommodating the rotation shaft and being configured to allow the bearing to be inserted from a free end side and move in a direction that intersects an insertion direction of the bearing and is perpendicular to an axial direction of the rotation shaft to a shaft support position where the bearing is fitted to the rotation shaft, the detachment prevention structure includes a rotational retaining section provided on the bearing and a retainer provided on the housing member, the rotational retaining section being configured to stop rotation of the bearing relative to the rotation shaft, the retainer being configured to retain the bearing while permitting rotation of the bearing relative to the rotation shaft within the rotational range in the assembled state, and the retainer includes a first retaining section and a second retaining section, the first retaining section being configured to retain an outer circumferential surface of the bearing in the shaft support position regardless of a rotational position of the bearing relative to the rotation shaft within the rotational range, the second retaining section being configured to stop the rotational retaining section when the second cover member rotates from the closed position to the open position.

According to another aspect of the present invention, in the electrical connection box, it is preferable that the rotational retaining section is formed on the outer circumferential surface of the free end of the bearing.

According to still another aspect of the present invention, in the electrical connection box, it is preferable that the bearing has an insertion opening inserting the rotation shaft to the shaft support position in a direction perpendicular to the axial direction, and the insertion opening opens in a direction intersecting a plane direction of a contact plane between the work opening and the second cover member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
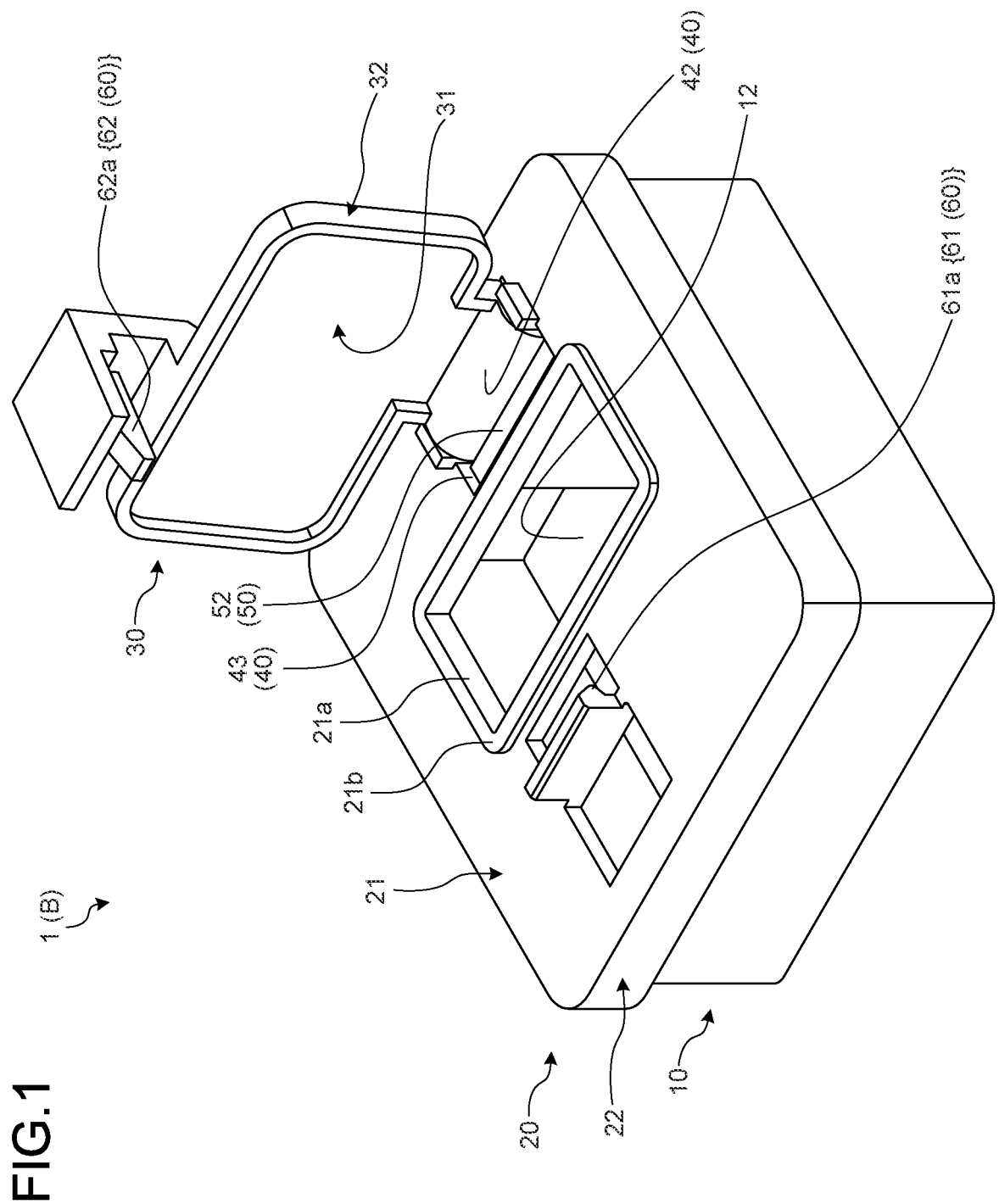
FIG. 1 is a perspective view of a cover structure for an electrical connection part of an embodiment illustrated in an open position together with an electric component housing (electrical connection box), which is the application target of the cover structure.
Figure 2:
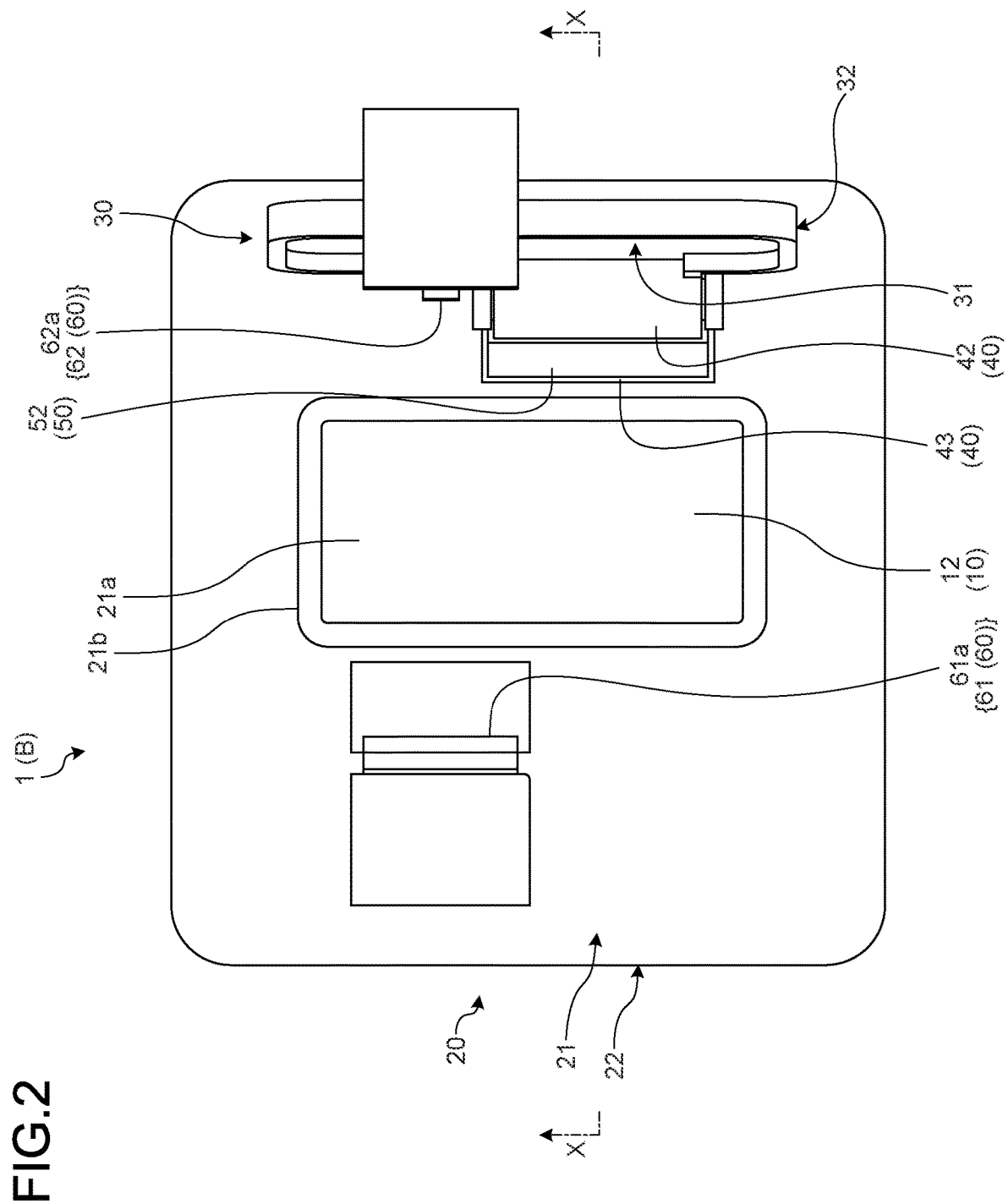
FIG. 2 is a top view of the cover structure for an electrical connection part of the embodiment illustrated in the open position together with the electric component housing (electrical connection box), which is the application target of the cover structure.

Referring to the drawings, embodiments of an electrical connection box and a cover structure for an electrical connection part according to the present invention are now described in detail. However, the present invention is not limited to these embodiments.

Embodiment

Referring to FIGS. 1 to 11, one embodiment of an electrical connection box and a cover structure for an electrical connection part according to the present invention is now described.

A cover structure 1 is applied to an electric component housing B for accommodating an electric component (FIGS. 1 to 8). For example, the electric component housing B may be an electrical connection box or a conductive module, such as a bus bar module.

In an electrical connection box, for example, an insulative housing encloses an electronic component serving as an electric connection object, to which another electric connection object, which may be a conductive member (e.g., a conductive bus bar) or an electric wire, is electrically connected within the housing. With this electrical connection box, an electrical connection part may be a physical and electrical connection part between the electronic component and the conductive member, a physical and electrical connection part between the electronic component and the electric wire, a physical and electrical connection part between the conductive member and the electric wire, or a physical and electrical connection part between the electric wires through terminal fittings. The electronic component may be a circuit protection component, such as a relay or a fuse. The electronic component may be an electronic device, such as a circuit board or an electronic control unit (ECU). For example, a plurality of electric wires extends from the electrical connection box, and electric connection objects such as devices and power supplies in the vehicle are electrically connected via the wires. The electrical connection box forms a wire harness with such wires.

With this electrical connection box, some work may be required for the electrical connection parts within the housing. Examples of the work relating to the electrical connection parts include attachment and detachment of the electronic component to and from the conductive member (insertion and extraction), attachment and detachment of the terminal fitting at an end of the electric wire to and from the electronic component or the conductive member (e.g., fastening by screws), attachment and detachment between terminal fittings (e.g., fastening by screws), attachment and detachment of a connector to and from the electronic component (insertion and extraction), and inspection of the circuit protection component. To this end, the housing has a work opening that enables work relating to the electrical connection parts. The work opening is covered with a cover member, which can be opened and closed.

For example, the conductive module may be used in a vehicle, such as an electric vehicle or a hybrid vehicle, to electrically connect adjacent battery cells forming a battery module, or to electrically connect battery cells to a battery monitoring unit. In this conductive module, a plurality of housing chambers may be formed in an insulative housing, and conductive members (e.g., conductive bus bars) may be accommodated in the respective housing chambers. The conductive members may physically and electrically connect the electrode terminals of the adjacent battery cells to each other. Furthermore, one end of an electric wire is physically and electrically connected to the conductive member in each housing chamber. The other end of the wire is physically and electrically connected to the battery monitoring unit. With this conductive module, an electrical connection part may be a physical and electrical connection part between the conductive member and the electrode terminal, a physical and electrical connection part between the conductive member and the electric wire, or a physical and electrical connection part between the electric wire and the battery monitoring unit.

In this conductive module, when attachment and detachment are performed on the battery module, certain work is performed on the electrical connection parts in the housing. Examples of work relating to the electrical connection parts include attachment and detachment of the conductive member to and from the electrode terminal (e.g., fastening by screws or welding) and attachment and detachment of the electric wire to and from the conductive member (e.g., connector insertion and extraction or welding). To this end, the housing has a work opening (an opening of each housing chamber) that enables work relating to the electrical connection parts. The work opening is covered with a cover member, which can be opened and closed.

Specifically, the electric component housing (electrical connection box or conductive module) B and the cover structure 1 of the present embodiment include a housing member 10 and a first cover member 20, which form a housing, and a second cover member 30, which closes the work opening of the housing (FIGS. 1 to 8). The housing member 10 and the first cover members 20 and the second cover member 30 are individually molded using an insulating material such as synthetic resin.

The housing member 10 has an opening 11 and an interior space 12 connecting to the opening 11 (FIGS. 3 and 6 to 8). The interior space 12 of the housing member 10 accommodates electrical connection parts (not illustrated). The housing member 10 detailed here has the shape of a rectangular box with one rectangular opening 11.

The first cover member 20 has a closure section 21, which closes the opening 11 of the housing member 10, and a tubular peripheral wall 22 projecting from the periphery of the closure section 21 (FIGS. 1 to 8). The closure section 21 closes the opening 11, and the inner circumference surface of the peripheral wall 22 covers the outer circumferential surface of the end at the opening 11 of the housing member 10. The first cover member 20 thus forms a box together with the housing member 10. The first cover member 20 detailed here has the rectangular closure section 21 having the shape of a flat plate and the peripheral wall 22 having the shape of a rectangular tube.

The closure section 21 of the first cover member 20 has a work opening 21a, which enables work relating to the electrical connection parts, and a peripheral wall section 21b, which projects outward (the outside of the assembled housing member 10 and the first cover member 20) from the rim of the work opening 21a (FIGS. 1 to 3 and 6 to 8). When the assembled housing member 10 and the first cover member 20 are viewed from the outside, the interior space 12 is located on the inner side of the work opening 21a, and the electrical connection parts are located on the inner side of the work opening 21a. The closure section 21 detailed here includes the rectangular work opening 21a and the peripheral wall section 21b, which has the shape of a rectangular tube.

The second cover member 30 has a closure section 31, which closes the work opening 21a in the closure section 21 of the first cover member 20, and a tubular peripheral wall 32 projecting from the periphery of the closure section 31 (FIGS. 1 to 8). The second cover member 30 closes the work opening 21a with its closure section 31, and covers the outer circumferential surface of the peripheral wall section 21b of the closure section 21 of the first cover member 20 with the inner circumference surface of the peripheral wall 32 of the second cover member 30. The second cover member 30 detailed here has the rectangular closure section 31 having the shape of a flat plate and the peripheral wall 32 having the shape of a rectangular tube.

Furthermore, the electric component housing (electrical connection box or conductive module) B and the cover structure 1 of the present embodiment include a hinge structure 40, which allows the second cover member 30 to rotate in a rotational range between an open position and a closed position relative to the work opening 21a (FIGS. 1 to 8). The second cover member 30 closes the work opening 21a in the closed position and opens the work opening 21a in the open position.

The hinge structure 40 includes a rotation shaft 41, which is formed in the closure section 21 of the first cover member 20, and an arc-shaped cantilever bearing 42, which is formed in the second cover member 30 and has an inner circumference surface supporting the rotation shaft 41 (FIGS. 3 to 8). The hinge structure 40 also includes a through hole 43 formed in the closure section 21 of the first cover member 20 (FIGS. 3 to 8). The through hole 43 is a hole formed in the closure section 21 of the first cover member 20 to accommodate the rotation shaft 41 and is also used when the bearing 42 is coupled to the rotation shaft 41.

The rotation shaft 41 is cylindrical and positioned next to and spaced apart from the work opening 21a. The rotation shaft 41 is positioned next to the work opening 21a together with the through hole 43 and accommodated in the through hole 43. This illustrative rotation shaft 41 is positioned next to and spaced apart from one side of the rim of the rectangular work opening 21a, and is arranged so that the direction in which the one side extends and the axial direction of the rotation shaft 41 are parallel.

At least one bearing 42 is provided in a cantilever manner with respect to the closure section 31 of the second cover member 30. The bearing 42 has a bearing section 42a formed as a curved part, which has an arcuate cross-sectional shape in a plane perpendicular to the axial direction (FIGS. 3 to 8). The bearing section 42a has a circumferential end connected to the fixed end of the bearing 42, and another circumferential end serving as the free end of the bearing 42. The bearing section 42a is semicircular or has the shape of a major arc. The bearing section 42a detailed here has a semicircular cross-sectional shape in a plane perpendicular to the axial direction, that is, has a semi-cylindrical shape.

The bearing section 42a has an arcuate inner circumference surface and an arcuate outer circumferential surface, and supports the rotation shaft 41 on its inner circumference surface. The bearing 42 has an insertion opening 42b for inserting the rotation shaft 41 to a shaft support position in a direction perpendicular to the axial direction (FIGS. 3 to 8). With this bearing 42, the opening of the arcuate shape of the bearing section 42a, which is a curved part, serves as the insertion opening 42b. Furthermore, if the bearing 42 has a projection extending tangentially from the other circumferential end of the bearing section 42a, this projection has the free end. As such, the opening at the free end of the projection serves as the insertion opening 42b. In either case, the insertion opening 42b allows the second cover member 30 to open in a direction that intersects the plane direction of the contact plane between the work opening 21a and the closure section 31 of the second cover member 30 (FIGS. 4 to 8). In other words, in this illustrative embodiment, the insertion opening 42b allows the second cover member 30 to open in a direction that intersects the plane direction of the rectangular closure section 31 having the shape of a flat plate. This illustrative insertion opening 42b of the second cover member 30 opens outward in one of the directions perpendicular to the plane direction of the closure section 31 (the direction away from the interior space 12) when the second cover member 30 is in the closed position relative to the work opening 21a. Accordingly, when the second cover member 30 is in the closed position, the rotation shaft 41 retains the bearing 42, limiting detachment of the second cover member 30 from the first cover member 20.

The through hole 43 is divided into two regions by the rotation shaft 41. One of the two regions of the through hole 43 separated by the rotation shaft 41 is used as an assembly work region for the coupling of the bearing 42 to the rotation shaft 41. With this through hole 43, of the two regions separated by the rotation shaft 41, the one used as the assembly work region is selected depending on in which of the directions perpendicular to the plane direction of the closure section 31 the insertion opening 42b opens. In this example, the region of the through hole 43 between the rotation shaft 41 and the work opening 21a is used as the assembly work region. If the insertion opening 42b opens inward in one of the directions perpendicular to the plane direction of the closure section 31 (the direction toward the interior space 12) when the second cover member 30 is in the closed position relative to the work opening 21a, the region of the through hole 43 that is located opposite to the work opening 21a with respect to the rotation shaft 41 is used as the assembly work region. In either case, the assembly work region of the through hole 43 is shaped and sized to allow the bearing 42 to be inserted from the free end and move in a direction that intersects the insertion direction and is perpendicular to the axial direction of the rotation shaft 41 to the shaft support position where the bearing 42 is fitted to the rotation shaft 41.

Furthermore, the electric component housing (electrical connection box or conductive module) B and the cover structure 1 of the present embodiment include a detachment prevention structure 50, which disables detachment of the second cover member 30 from the first cover member 20 in an assembled state in which the first cover member 20 to which the second cover member 30 is coupled to the housing member 10 (FIGS. 1 to 8). The detachment prevention structure 50 includes a rotational retaining section 51, which is formed in the bearing 42 to stop the rotation of the bearing 42 relative to the rotation shaft 41, and a retainer 52, which is formed in the housing member 10 to retain the bearing 42 while permitting the rotation of the bearing 42 relative to the rotation shaft 41 within the rotational range described above in the assembled state (FIGS. 3 and 5 to 7).

The rotational retaining section 51 protrudes from the outer circumferential surface of the bearing 42 (FIGS. 3 to 8). The illustrated rotational retaining section 51 is formed on the outer circumferential surface of the free end of the bearing 42. In this example, the rotational retaining section 51 is provided as a protrusion on the outer circumferential surface of the other circumferential end of the bearing section 42a.

The retainer 52 includes a first retaining section 52a, which is configured to retain the outer circumferential surface of the bearing 42 in the shaft support position regardless of the rotational position of the bearing 42 relative to the rotation shaft 41 within the rotational range described above (FIGS. 3, 6, and 7). The first retaining section 52a is formed as an arcuate surface that faces the outer circumferential surface of the bearing section 42a in the assembled state and is coaxial with the bearing section 42a. This illustrative first retaining section 52a faces the outer circumferential surface of the bearing section 42a in the assembled state with a minute gap created in between. The bearing 42 is thus retained by the first retaining section 52a in the shaft support position regardless of the position of the second cover member 30 within the rotational range between the open position and the closed position. This limits detachment of the second cover member 30 from the first cover member 20.

Figure 3:
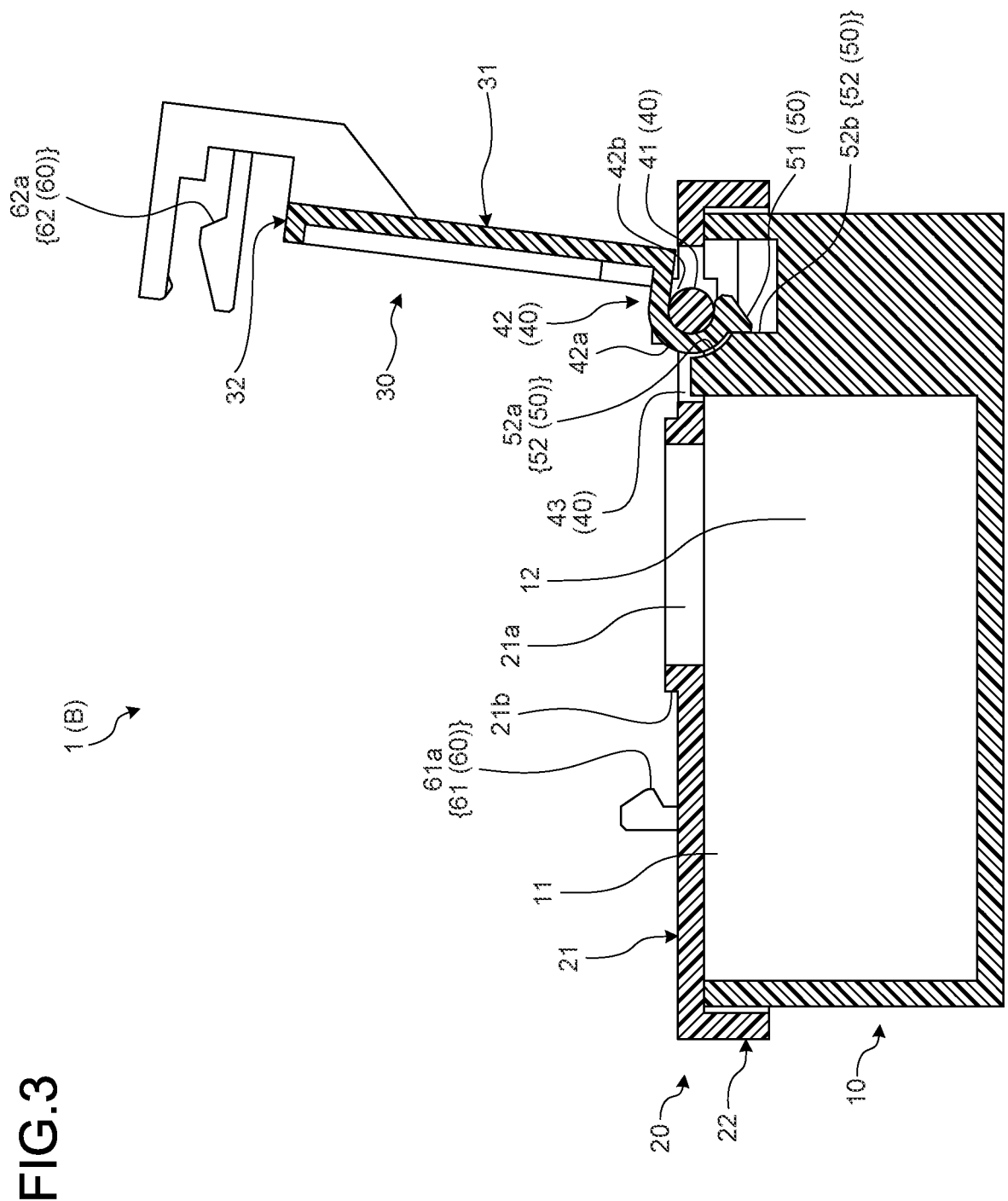
FIG. 3 is a cross-sectional view taken along line X-X of FIG. 2.
Figure 6:
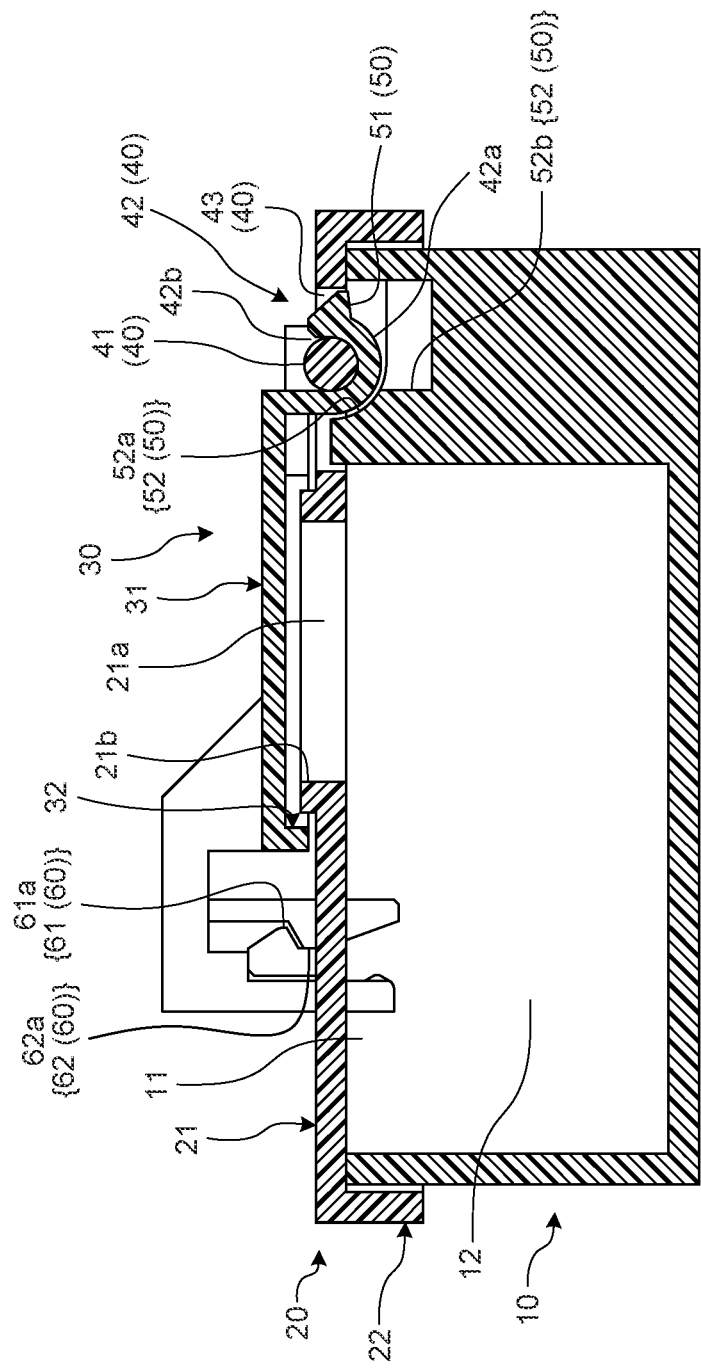
FIG. 6 is a cross-sectional view taken along line X-X of FIG. 5.
Figure 7:
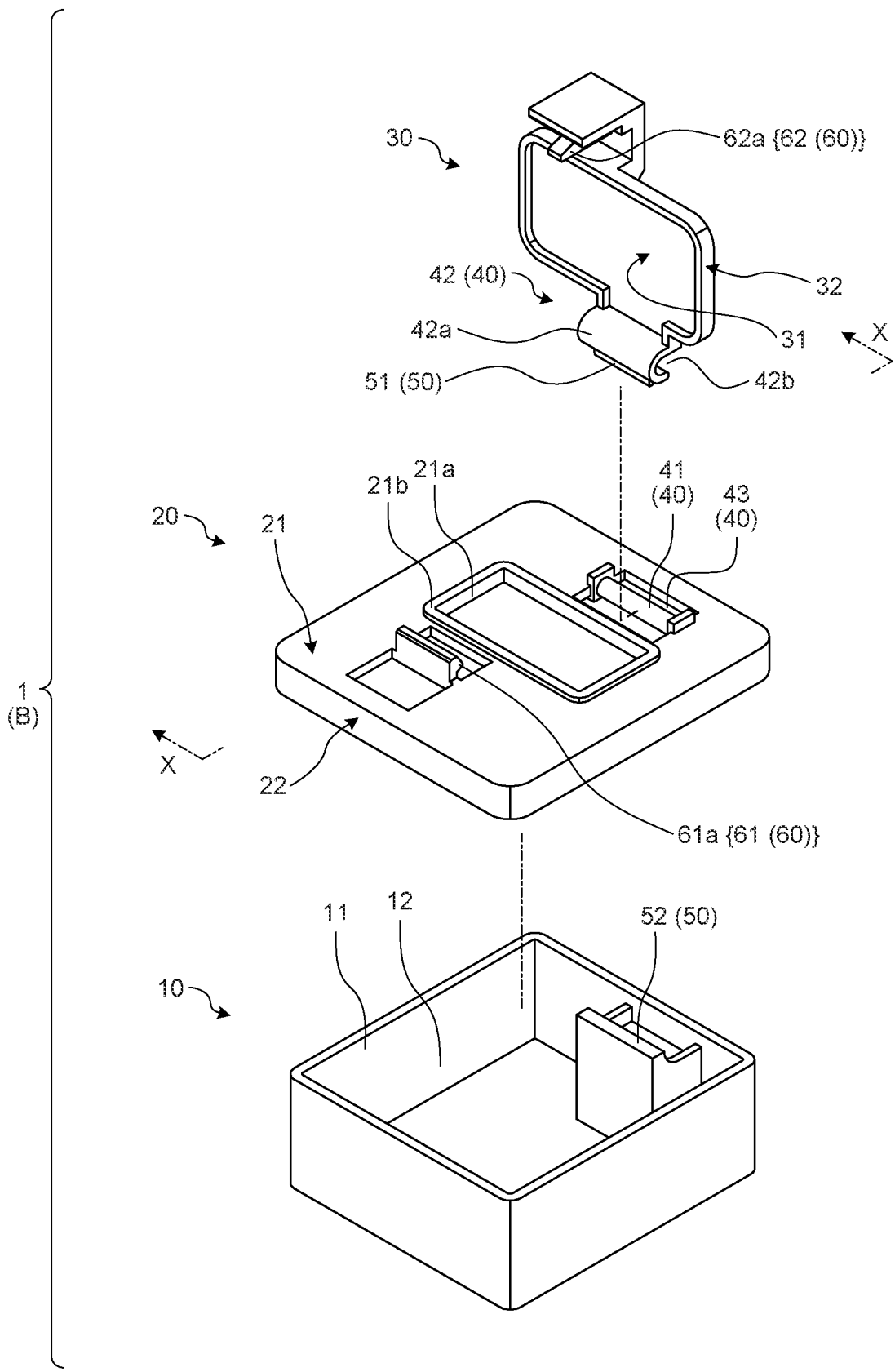
FIG. 7 is an exploded perspective view of the cover structure for an electrical connection part and the electric component housing (electrical connection box)
Figure 8:
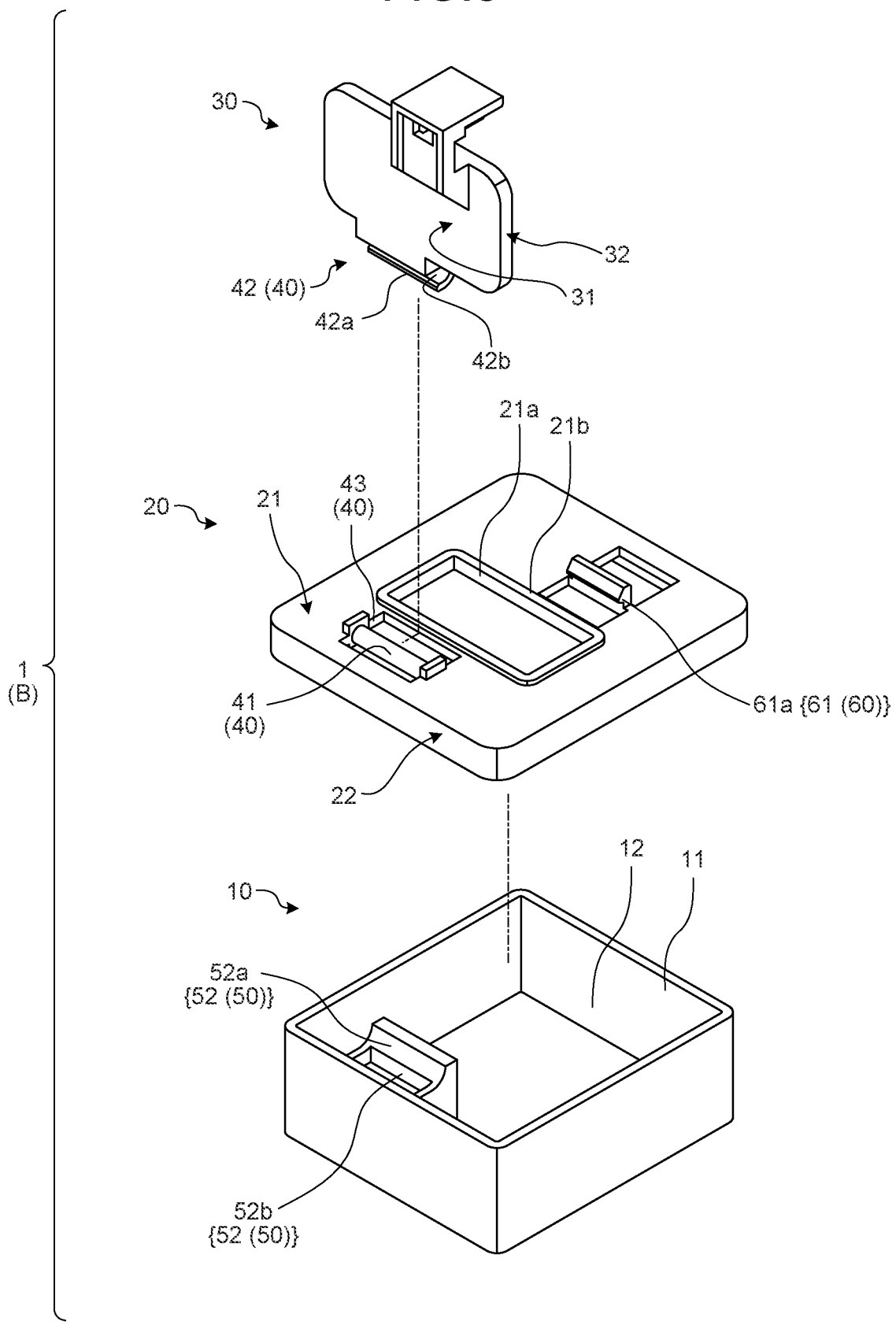
FIG. 8 is an exploded perspective view of the cover structure for an electrical connection part and the electric component housing (electrical connection box) as viewed from a different angle.

If the bearing 42 does not include the rotational retaining section 51, the second cover member 30 can move rotationally beyond the open position when moving from the closed position to the open position. The free end of the bearing 42 of such a second cover member 30 can therefore move out of the through hole 43. That is, the second cover member 30 can be detached from the first cover member 20. For this reason, the retainer 52 includes a second retaining section 52b, which stops the rotational retaining section 51 when the second cover member 30 rotates from the closed position to the open position (FIGS. 3, 6, and 7). The second retaining section 52b is a stopper wall surface that stops the rotational retaining section 51 so that the second cover member 30 in the open position does not rotate away from the closed position. The illustrative second retaining section 52b is formed as a flat surface continuous with the first retaining section 52a. When the second cover member 30 rotates from the closed position to the open position, the second retaining section 52b stops the rotational retaining section 51, preventing rotation beyond the open position. This limits detachment of the second cover member 30 from the first cover member 20.

Figure 4:
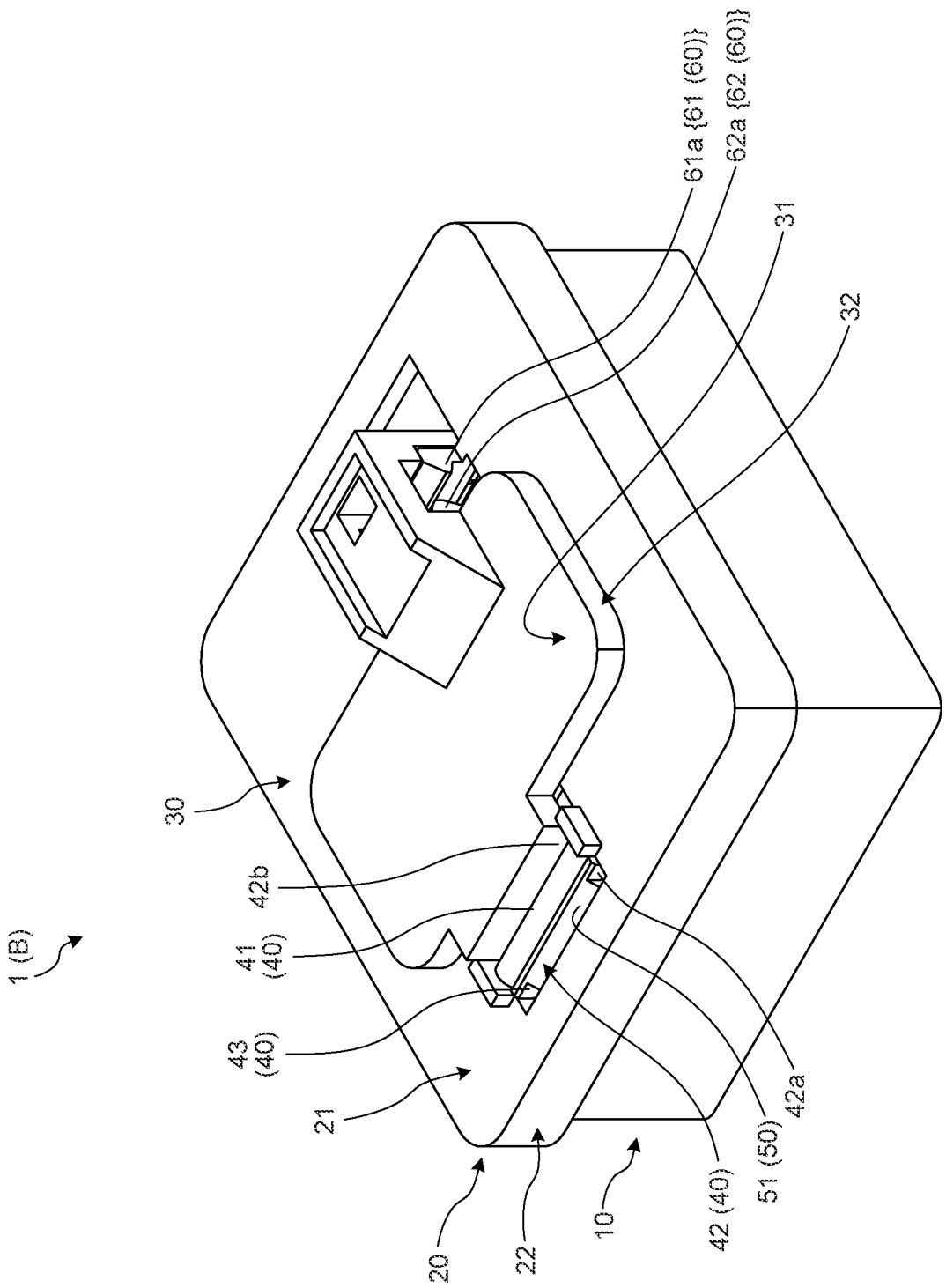
FIG. 4 is a perspective view of the cover structure for an electrical connection part of the embodiment illustrated in a closed position together with the electric component housing (electrical connection box), which is the application target of the cover structure.
Figure 5:
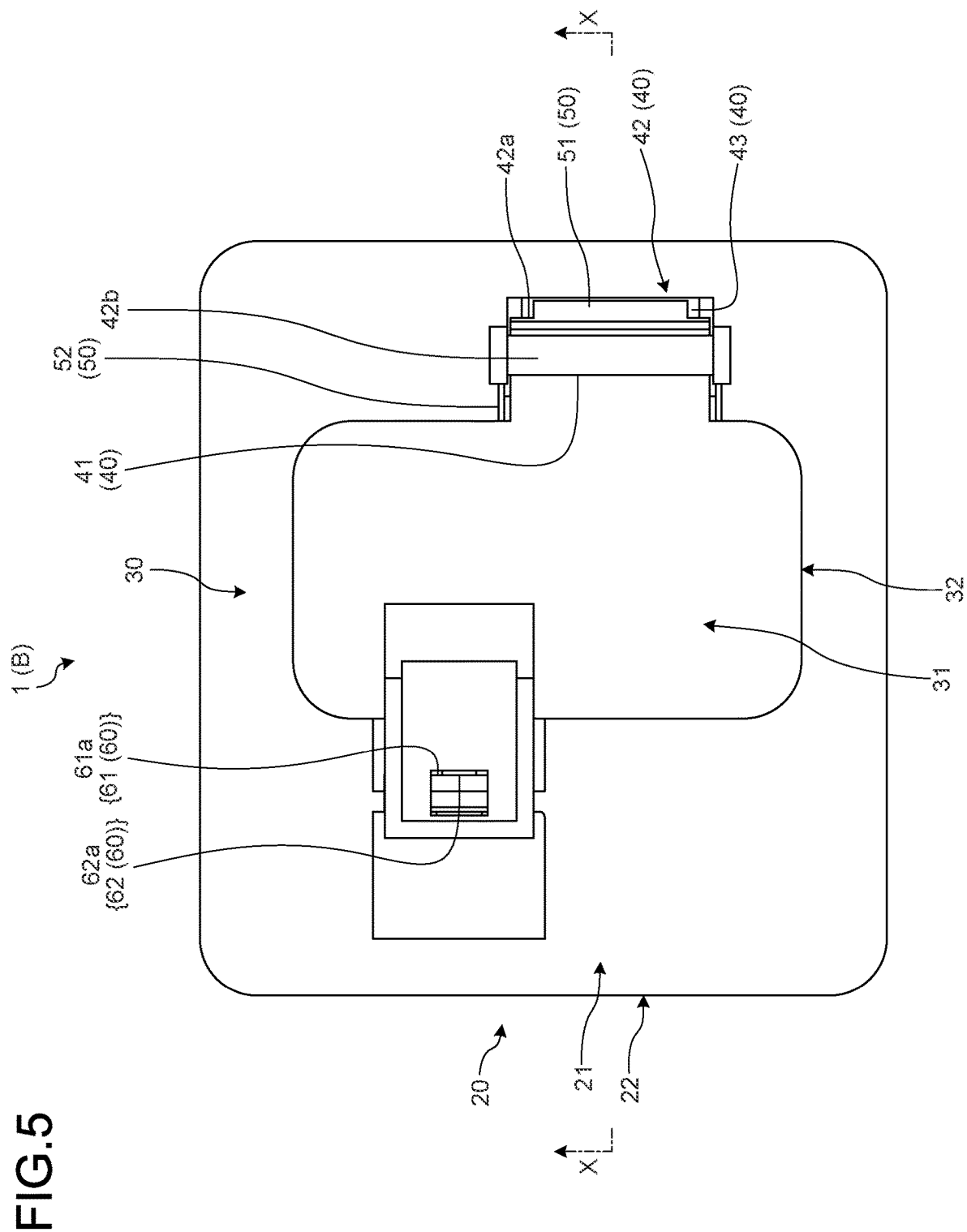
FIG. 5 is a top view of the cover structure for an electrical connection part of the embodiment illustrated in the closed position together with the electric component housing (electrical connection box), which is the application target of the cover structure.

The electric component housing (electrical connection box or conductive module) B and the cover structure 1 further include a lock structure 60, which holds the second cover member 30 to the first cover member 20 in the closed position (FIGS. 1 to 8). The lock structure 60 may include a first locking section 61 formed in the first cover member 20 and a second locking section 62 formed in the second cover member 30 (FIGS. 1 to 7). The lock structure 60 locks the second cover member 30 from moving in the opening direction with the first and the second locking sections 61 and 62 in the closed position, thereby holding the second cover member 30 to the first cover member 20 (FIGS. 4 to 6). A hook 61a of the first locking section 61 and a hook 62a of the second locking section 62 face each other in the closed position. The hooks 61a and 62a engage with each other when the second cover member 30 is about to move relative to the first cover member 20 in the opening direction, thereby holding the second cover member 30 to the first cover member 20.

Figure 9:
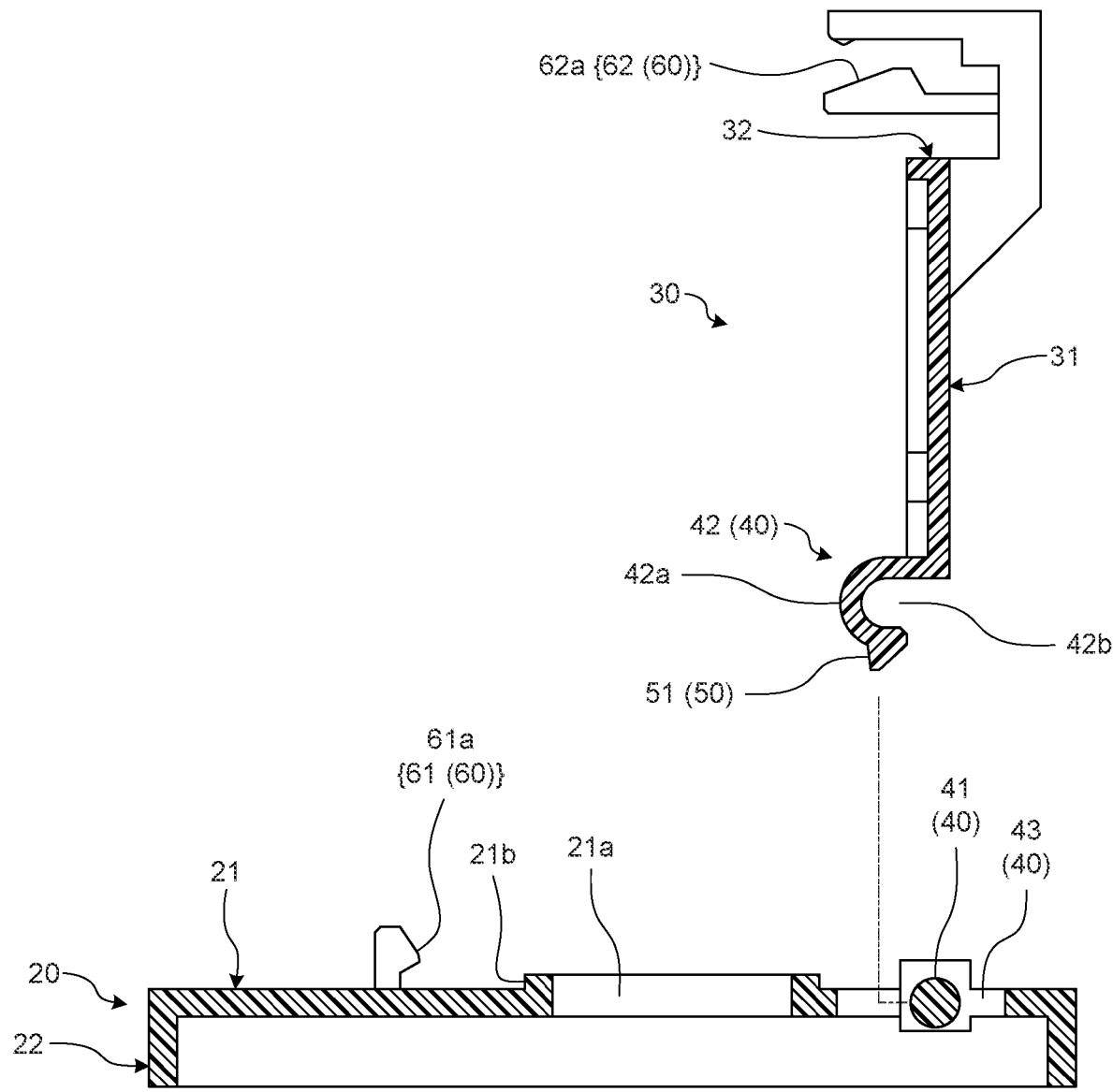
FIG. 9 is a cross-sectional view taken along line X-X of FIG. 7, illustrating only the first and the second cover members.
Figure 10:
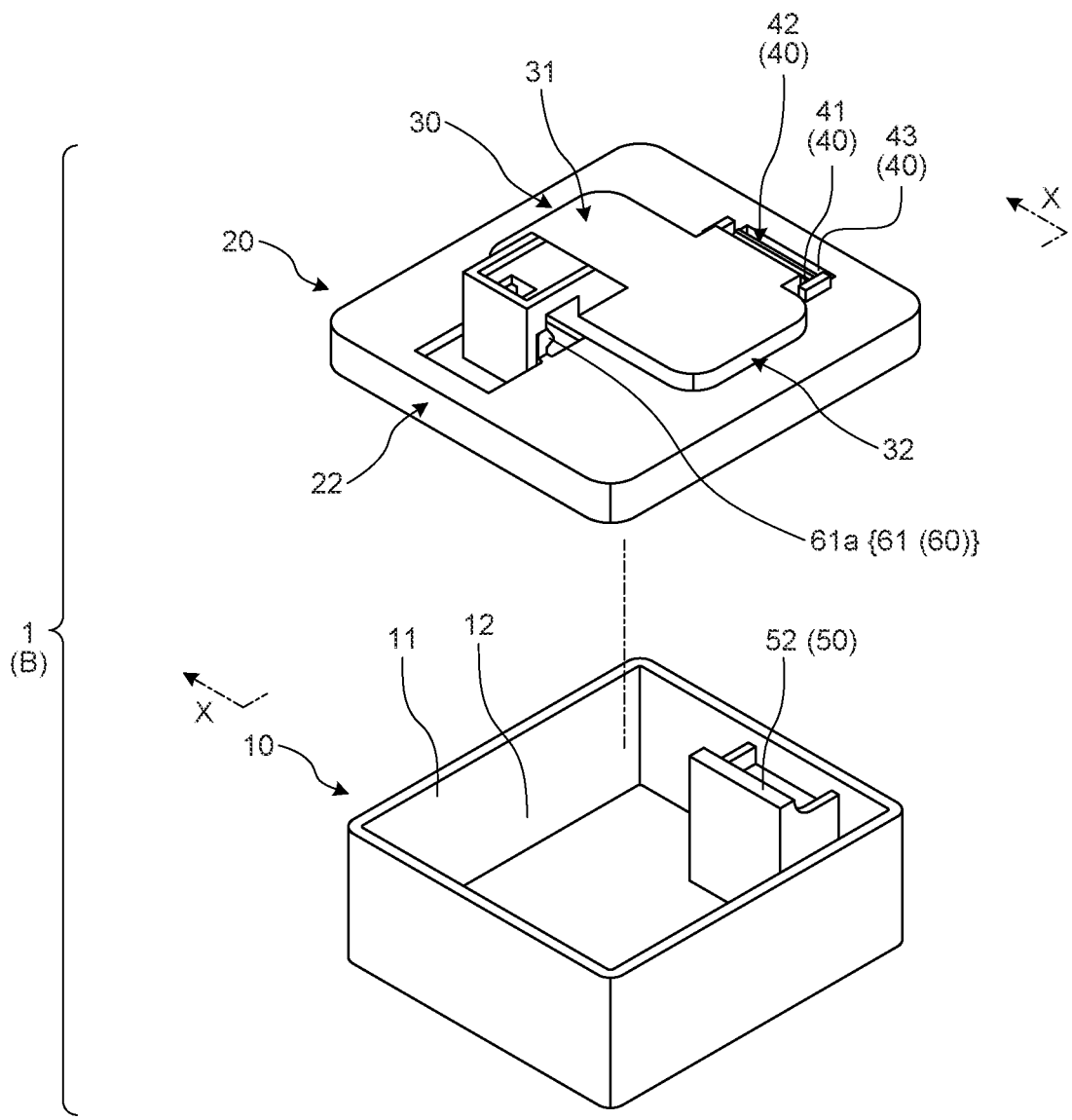
FIG. 10 is an exploded perspective view of the electric component housing (electrical connection box) after the first and the second cover members are assembled.
Figure 11:
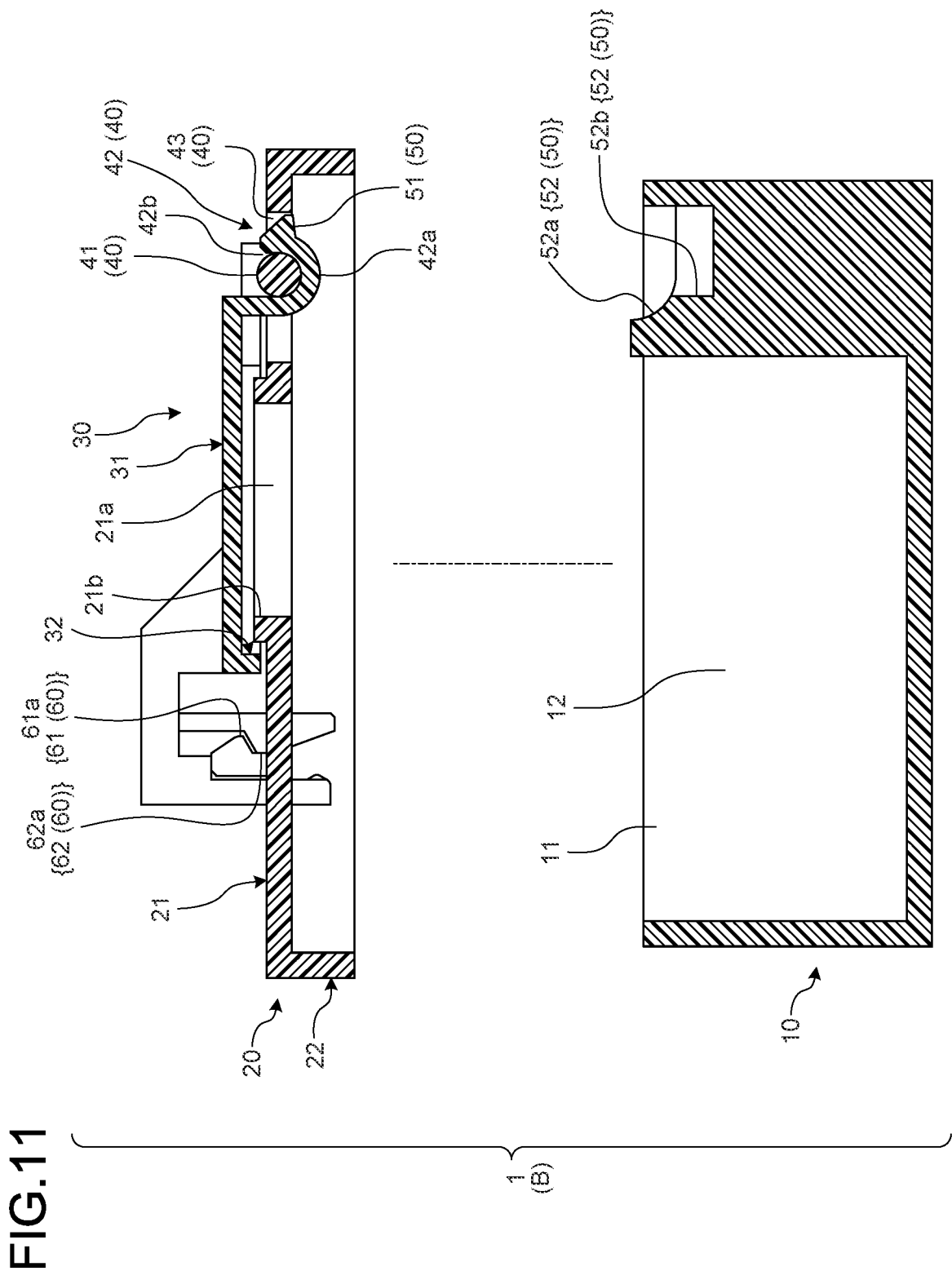
FIG. 11 is a cross-sectional view taken along line X-X of FIG. 10.

With the electric component housing (electrical connection box or conductive module) B and the cover structure 1 for an electrical connection part of the present embodiment, the rotation shaft 41 is first fitted to the inner circumference surface of the bearing 42 to assemble the first and the second cover members 20 and 30 together (FIGS. 9 to 11). In this example, when the first and the second cover members 20 and 30 are assembled, the first and the second locking sections 61 and 62 of the lock structure 60 are in engagement. With the electric component housing (electrical connection box or conductive module) B and the cover structure 1, the first cover member 20 to which the second cover member 30 is coupled is then coupled to the housing member 10 (from the state in FIGS. 10 and 11 to the state in FIGS. 4 to 6). As a result, in the electric component housing (electrical connection box or conductive module) B and the cover structure 1, the detachment prevention structure 50 is in a state where the detachment prevention structure 50 can exhibit its function, thereby limiting detachment of the second cover member 30 from the first cover member 20. That is, the electric component housing (electrical connection box or conductive module) B and the cover structure 1 are in a state where the first retaining section 52a retains the outer circumferential surface of the bearing 42 in the shaft support position, and the second retaining section 52b stops the rotational retaining section 51 when the second cover member 30 is rotated from the closed position to the open position.

As described above, the electric component housing (electrical connection box or conductive module) B and the cover structure 1 for an electrical connection part of the present embodiment can limit detachment of the second cover member 30 from the first cover member 20 regardless of the rotational position of the second cover member 30 relative to the first cover member 20 in the rotational range described above.

In the electrical connection box and the cover structure for an electrical connection part of the present embodiment, the bearing of the second cover member is retained by the first retaining section of the retainer in the shaft support position regardless of the position within the rotational range between the open position and the closed position. The electrical connection box and the cover structure for an electrical connection part thus limit detachment of the second cover member from the first cover member. Additionally, with the electrical connection box and the cover structure for an electrical connection part, when the second cover member rotates from the closed position to the open position, the second retaining section of the retainer stops the rotational retaining section, preventing rotation beyond the open position. The electrical connection box and the cover structure for an electrical connection part thus limit detachment of the second cover member from the first cover member. As described above, the electrical connection box and the cover structure for an electrical connection part according to the present embodiment can limit detachment of the second cover member from the first cover member regardless of the rotational position of the second cover member relative to the first cover member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
    a housing member having an opening and an interior space connecting to the opening, the interior space accommodating an electrical connection part;
    a first cover member including a closure section that closes the opening and has a work opening enabling work relating to the electrical connection part;
    a second cover member configured to close the work opening;
    a hinge structure configured to allow the second cover member to rotate within a rotational range between an open position and a closed position relative to the work opening; and
    a detachment prevention structure configured to disable detachment of the second cover member from the first cover member in an assembled state in which the first cover member to which the second cover member is coupled is coupled to the housing member, wherein
    the hinge structure includes a rotation shaft provided on the closure section, an arc-shaped cantilever bearing provided on the second cover member, the bearing having an inner circumference surface supporting the rotation shaft, and a through hole formed in the closure section, the through hole accommodating the rotation shaft and being configured to allow the bearing to be inserted from a free end side and move in a direction that intersects an insertion direction of the bearing and is perpendicular to an axial direction of the rotation shaft to a shaft support position where the bearing is fitted to the rotation shaft,
    the detachment prevention structure includes a rotational retaining section provided on the bearing and a retainer provided on the housing member, the rotational retaining section being configured to stop rotation of the bearing relative to the rotation shaft, the retainer being configured to retain the bearing while permitting rotation of the bearing relative to the rotation shaft within the rotational range in the assembled state, and
    the retainer includes a first retaining section and a second retaining section, the first retaining section being configured to retain an outer circumferential surface of the bearing in the shaft support position regardless of a rotational position of the bearing relative to the rotation shaft within the rotational range, the second retaining section being configured to stop the rotational retaining section when the second cover member rotates from the closed position to the open position.

2. The electrical connection box according to claim 1, wherein
    the rotational retaining section is formed on the outer circumferential surface of the free end of the bearing.

3. The electrical connection box according to claim 1, wherein
    the bearing has an insertion opening inserting the rotation shaft to the shaft support position in a direction perpendicular to the axial direction, and
    the insertion opening opens in a direction intersecting a plane direction of a contact plane between the work opening and the second cover member.

4. The electrical connection box according to claim 2, wherein
    the bearing has an insertion opening inserting the rotation shaft to the shaft support position in a direction perpendicular to the axial direction, and
    the insertion opening opens in a direction intersecting a plane direction of a contact plane between the work opening and the second cover member.

5. A cover structure for an electrical connection part comprising:
    a housing member having an opening and an interior space connecting to the opening, the interior space accommodating an electrical connection part;
    a first cover member including a closure section that closes the opening and has a work opening enabling work relating to the electrical connection part;
    a second cover member configured to close the work opening;
    a hinge structure configured to allow the second cover member to rotate within a rotational range between an open position and a closed position relative to the work opening; and
    a detachment prevention structure configured to disable detachment of the second cover member from the first cover member in an assembled state in which the first cover member to which the second cover member is coupled is coupled to the housing member, wherein
    the hinge structure includes a rotation shaft provided on the closure section, an arc-shaped cantilever bearing provided on the second cover member, the bearing having an inner circumference surface supporting the rotation shaft, and a through hole formed in the closure section, the through hole accommodating the rotation shaft and being configured to allow the bearing to be inserted from a free end side and move in a direction that intersects an insertion direction of the bearing and is perpendicular to an axial direction of the rotation shaft to a shaft support position where the bearing is fitted to the rotation shaft,
    the detachment prevention structure includes a rotational retaining section provided on the bearing and a retainer provided on the housing member, the rotational retaining section being configured to stop rotation of the bearing relative to the rotation shaft, the retainer being configured to retain the bearing while permitting rotation of the bearing relative to the rotation shaft within the rotational range in the assembled state, and
    the retainer includes a first retaining section and a second retaining section, the first retaining section being configured to retain an outer circumferential surface of the bearing in the shaft support position regardless of a rotational position of the bearing relative to the rotation shaft within the rotational range, the second retaining section being configured to stop the rotational retaining section when the second cover member rotates from the closed position to the open position.

* * * * *